Patented Sept. 21, 1926.

1,600,763

UNITED STATES PATENT OFFICE.

MAX ISLER AND LUKAS von MECHEL, OF BASEL, SWITZERLAND, ASSIGNORS TO SOCIETY OF CHEMICAL INDUSTRY IN BASLE, OF BASEL, SWITZERLAND.

AZO DYESTUFFS AND PROCESS OF MAKING SAME.

No Drawing. Application filed December 9, 1924, Serial No. 754,841, and in Switzerland December 28, 1923.

The invention relates to the new dyestuffs, the process of making same, as well as to the material dyed with the new dyestuff.

It has been found that new azo dyestuffs corresponding to the general formula:

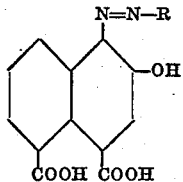

in which R stands for any aromatic residue, may be obtained by coupling 3-hydroxy-naphthalene-1:8-dicarboxylic acid with a diazo compound. The coupling component imparts to the dyestuffs quite a general mordant character, which can be enhanced by selection of the diazo compound used. For that purpose diazo compounds derived from 0-hydroxyamino compounds are particularly appropriate. The new dyestuffs form red to violet, blue, and black powders, dissolving in water to yellow-red, red, violet and blue solutions, in concentrated sulfuric acid to red, violet and blue solutions, and in aqueous sodium carbonate solutions to yellow-red and blue solutions, and dyeing the animal and vegetable fibre from yellow-orange to red, violet, blue, black and brown tints which, when afterchromed, yield fast orange to red, blue, green-black and brown-black tints. Their chrome printing on cotton yields orange to violet blue, grey and brown to black tints.

These dyestuffs, when treated with reducing agents, split into an aromatic amino compound and the 4-amino-3-hydroxynaphthalene-1:8-dicarboxylic acid.

The following examples illustrate the invention without limiting it, the parts being by weight:—

Example 1.

9.3 parts of aniline are diazotized as usual and the solution thus obtained is introduced into a solution of 21.4 parts of 3-hydroxy-naphthalene-1:8-dicarboxylic acid anhydride and 40 parts of anhydrous sodium carbonate in 500 parts of water. The dyestuff which forms very quickly is salted out, filtered and dried. It is a brown-red powder and dyes wool yellow-red tints which pass towards brown when afterchromed. The formula of the new dyestuff is most probably:

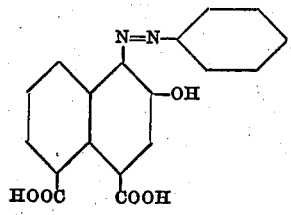

Example 2.

23.3 parts of 1-hydroxy-2-aminobenzene-4-sulpho-6-carboxylic acid are diazotized as usual and introduced into a solution of 21.4 parts of 3-hydroxynaphthalene-1:8-dicarboxylic acid anhydride, 8 parts of caustic soda and 40 parts of anhydrous sodium carbonate in 500 parts of water. The whole is stirred until the diazo-compound has disappeared. The dyestuff is then salted out, filtered and dried. It is a brown powder soluble in water to a red-brown solution and in concentrated sulphuric acid to a blue-red solution. It dyes wool in an acid bath Bordeaux tints which pass towards dark violet when afterchromed and to violet when aftercoppered. The formula of the new dyestuff is most probably:

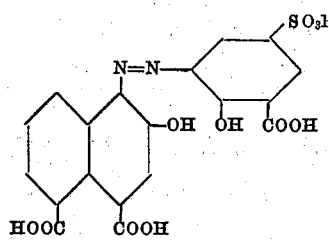

Example 3.

23.5 parts of 3-hydroxy-naphthalene-1:8-dicarboxylic acid are introduced into 54 parts of caustic soda solution of 30 per cent. strength; the whole is cooled and there are added 31.7 parts of the sodium salt of the nitrated diazo-compound from 1-amino-2-hydroxynaphthalene-4-sulphonic acid. After stirring for some time the temperature is allowed to rise gradually to 15° C. and stirring is continued at this temperature until the diazo-compound has disappeared. Dilution with water follows and the dyestuff is separated by acidification. It is a blackish powder and dissolves in water to a red-violet solution, in dilute caustic soda solution to a violet-brown solution and in concentrated sulphuric acid to a blue solution. It dyes wool in an acid bath blackish-violet tints which become dark green and fast when afterchromed.

The following table indicates the main properties of a number of dyestuffs obtainable by this invention:—

| Component to be diazotized. | Color of the dyestuff powder. | Solution in water. | Solution in aqueous sodium carbonate. | Solution in concentrated sulphuric acid. | Dyeing on wool. | Dyeing on wool, afterchromed. | Dyeing on wool, aftercoppered. | Chrome printing on cotton. |
|---|---|---|---|---|---|---|---|---|
| Aniline | Red | Yellow-red | Yellow-red | Red | Yellow-red | Yellow-brown | | |
| Paranitraniline | Red | Yellow-red | Violet-red | Blue-red | Brown | Brown | | Brown. |
| Meta-amino-benzoic acid. | Brown | Yellow-red | Brown-red | Yellow-red | Orange | Orange | | Orange. |
| Anthranilic acid | Red | Yellow-red | Yellow-red | Blue-red | Red | Violet-brown | | Red-brown. |
| 5-nitro-3-amino-1-benzoic acid. | Orange-yellow. | Yellow-red | Brown-red | Blue-red | Yellow-orange | Brown | | |
| 5-sulpho-3-amino-1-benzoic acid. | Brown-red | Yellow-red | Brown-red | Blue-red | Orange | Brown | | |
| 4-chloro-2-amino-1-phenol. | Brown | Blue-red | Blue-violet | Violet-blue | Bordeaux | Dark-blue | Violet-grey | Steel-blue. |
| 4-nitro-2-amino-1-phenol. | Black | Violet | Violet | Blue-red | Violet-brown | Black | | Black-brown |
| 4:6-dinitro-2-amino-1-phenol. | Brown-black | Violet-red | Bordeaux | Blue-red | Violet-black | Reddish-black | | Grey-black. |
| 5-nitro-2-amino-1-phenol. | Brown | Blue | Blue | Blue-red | Violet-brown | Green-black | | Blue-grey. |
| 4-methyl-6-nitro-2-amino-1-phenol. | Black | Blue | Blue | Violet-red | Brown-grey | Blue-grey | | Blue-grey. |
| 2-amino-1-phenol-4-sulphonic acid. | Brown-black | Brown-red | Violet | Blue-red | Bordeaux | Red-blue | Violet | Violet. |
| 4-methyl-2-amino-1-phenol-6-sulphonic acid. | Violet-black | Blue | Blue | Blue-red | Bordeaux | Grey-blue | Blue-violet | Reddish-blue. |
| 4-chloro-2-amino-1-phenol-6-sulphonic acid. | Brown-black | Blue | Reddish-blue. | Red-violet | Violet-brown | Blue | Violet-blue | Blue. |
| 6-nitro-2-amino-1-phenol-4-sulphonic acid. | Black | Violet | Violet | Blue-red | Blue | | Violet | Blue-black. |
| 4-nitro-2-amino-1-phenol-6-sulphonic acid. | Brown | Violet | Red-violet | Blue-red | Black | Greenish-black. | | Violet-black. |
| 2-amino-1-phenol-4-sulpho-6-carboxylic acid. | Brown | Red | Violet | Blue-red | Bordeaux | Dark violet | Red-violet | Violet. |
| 2-amino-1-phenol-4-chloro-6-carboxylic acid. | Dark brown | Red | Violet | Violet-blue | Bordeaux | Blue-violet | Brown-violet | Violet. |
| 2-amino-1-phenol-4-nitro-6-carboxylic acid. | Grey-black | Blue-violet | Red-violet | Blue-red | Bordeaux | Violet-brown | Brown-violet | Violet. |
| 2-amino-1-phenol-4-carboxylic acid. | Reddish-brown. | Blue-red | Violet | Blue-red | Brown | Black-brown | | Violet. |
| 6-nitro-2-amino-1-phenol-4-carboxylic acid. | Brown-black | Bordeaux | Bordeaux | Blue-red | Black-brown | Violet-black | | Violet-black. |
| 4-amino-1-phenol-6-carboxylic acid. | Red-brown | Yellow-red | Brown-red | Blue-red | Orange-brown | Violet-brown | Yellow-brown. | Brown. |
| Nitrated diazo-compound of—1-amino-2-oxy-naphthalene-4-sulphonic acid. | Blackish powder. | Red-violet | Blue | Blue | Black-violet | Dark green | | |

| Component to be diazotized. | Color of the dyestuff powder. | Solution in water. | Solution in aqueous sodium carbonate. | Solution in concentrated sulphuric acid. | Dyeing on cotton. |
|---|---|---|---|---|---|
| Benzidine | Brown | Bordeaux | Bordeaux | Blue | Red-violet. |
| Toluidine | Brown | Red-violet | Violet | Blue | Violet. |
| Dianisidine | Brown | Red-blue | Violet-blue | Greenish-blue | Red-blue. |

What we claim is:—

1. As a new process the herein described manufacture of new azo dyestuffs corresponding to the general formula:

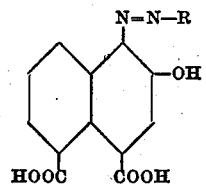

wherein R stands for any aromatic residue, consisting in coupling 3-hydroxynapthalene-1:8-dicarboxylic acid with a diazo-compound.

2. As a new process the herein described manufacture of the new azo dyestuffs corresponding to the general formula:

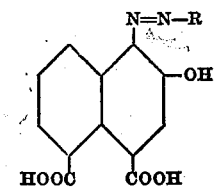

wherein R stands for a residue of a diazotized aromatic ortho-hydroxyamino compound, consisting in coupling 3-hydroxynapthalene-1:8-dicarboxylic acid with a diazotized aromatic ortho-hydroxyamino compound.

3. As a new process the herein described manufacture of new azo dyestuffs corresponding to the general formula:

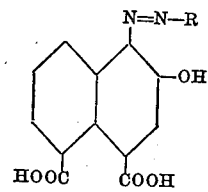

wherein R stands for a residue of a diazotized ortho-amino-phenol compound, consisting in coupling 3-hydroxynaphthalene-1:8-dicarboxylic acid with a diazotized ortho-amino-phenol compound.

4. As new products the herein described new azo dyestuffs corresponding to the general formula:

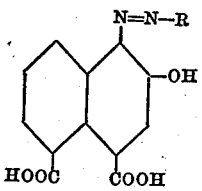

wherein R stands for any aromatic residue, which dyestuffs form red to violet, blue and black powders, dissolving in water to yellow-red, red, blue and violet solutions, in concentrated sulphuric acid to yellow-red, violet and greenish-blue solutions, in aqueous sodium carbonate solutions to yellow-red and blue solutions, and dyeing the animal and vegetable fibre yellow-orange to red, violet, blue, black and brown tints which, when afterchromed, yield fast orange to red, blue, green-black and brown-black tints, and which dyestuffs yield, when printed on cotton with chrome mordants, orange to violet, blue grey, black and brown tints, and when treated with reducing agents split into an aromatic amino compound and 4-amino-3-hydroxy-naphthalene-1:8-dicarboxylic acid.

5. As new products the herein described new azo dyestuffs corresponding to the general formula:

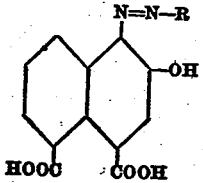

wherein R stands for a residue of a diazotized ortho-hydroxy-amino compound, which dyestuffs form brown and black powders, dissolving in water to yellow-red, violet and blue solutions, in concentrated sulphuric acid to red, violet and blue solutions, in aqueous sodium carbonate solution to Bordeaux, violet and blue solutions, dyeing wool Bordeaux, violet, blue, black and brown tints which, when afterchromed, yield fast violet, blue, green, black and brown tints when printed on cotton with chrome mordants yield violet to grey, blue and blackish tints, and which dyestuffs, when treated with reducing agents split into an ortho-hydroxy-amino compound and 4-amino-3-hydroxynaphthalene-1:8-dicarboxylic acid.

6. As new products the herein described new azo dyestuffs corresponding to the general formula:

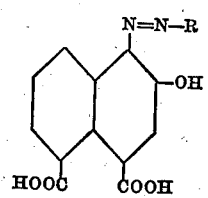

wherein R stands for a residue of a diazotized ortho-amino-phenol compound, which dye-stuffs form brown and black powders, dissolving in water to yellow-red, Bordeaux, violet and blue solutions, in concentrated sulphuric acid to red, violet and blue solutions, in aqueous sodium carbonate solutions to Bordeaux, violet and blue solutions, dyeing wool Bordeaux, blue, brown and black tints which, when afterchromed, yield fast violet, blue, green, black and brown tints when printed on cotton with chrome mordants yield violet to grey, blue and blackish tints, and which dyestuffs, when treated with reducing agents, split into an ortho-amino-phenol compound and 4-amino-3-hydroxynaphthalene-1:8-dicarboxylic acid.

7. The material dyed with the new dyestuffs of claim 4.

8. The material dyed with the dyestuffs of claim 5.

9. The material dyed with the new dyestuffs of claim 6.

In witness whereof we have hereunto signed our names this 25th day of November, 1924.

MAX ISLER.
LUKAS v. MECHEL.